United States Patent [19]

Moore

[11] Patent Number: 4,882,888
[45] Date of Patent: Nov. 28, 1989

[54] LAMINATED WALL CONSTRUCTION

[75] Inventor: William C. Moore, Holliston, Mass.

[73] Assignee: Dryvit System, Inc., Warwick, R.I.

[21] Appl. No.: 271,028

[22] Filed: Nov. 14, 1988

[51] Int. Cl.⁴ ............................................... E04C 2/00
[52] U.S. Cl. ..................................... 52/309.9; 52/404;
  52/408; 428/198; 428/247
[58] Field of Search ................ 52/408, 404, 309.9,
  52/612; 428/198, 247, 251, 285

[56] References Cited

U.S. PATENT DOCUMENTS

| | | | |
|---|---|---|---|
| 3,935,355 | 1/1976 | Kuhn | 428/251 X |
| 4,082,882 | 4/1978 | Weinstein et al. | 428/251 X |
| 4,272,936 | 6/1981 | Bonaguidi | 52/408 X |
| 4,449,336 | 5/1984 | Kelly | 52/408 X |
| 4,525,967 | 7/1985 | Simpson | 52/408 X |
| 4,658,554 | 4/1987 | Riley et al. | 52/408 X |
| 4,783,942 | 11/1988 | Nunley et al. | 52/408 X |
| 4,798,756 | 1/1989 | Fukushima et al. | 428/198 |

FOREIGN PATENT DOCUMENTS

| | | | |
|---|---|---|---|
| 1143532 | 2/1983 | Canada | 52/404 |
| 299631 | 6/1954 | Switzerland | 52/408 |
| 316660 | 1/1956 | Switzerland | 428/247 |

Primary Examiner—Carl D. Friedman
Assistant Examiner—Lan Mai
Attorney, Agent, or Firm—Salter & Michaelson

[57] ABSTRACT

A laminated wall construction for building exteriors comprising a gypsum sheathing having a non woven fiberglass layer covering at least one surface thereof, an acrylic water-based coating completely covering said fiberglass surface, and a cementitious adhesive applied to said coating for receiving and securing an insulating layer.

3 Claims, 1 Drawing Sheet

LAMINATED WALL CONSTRUCTION

BACKGROUND AND SUMMARY OF THE INVENTION

The present invention relates generally to wall constructions for building exteriors and is particularly concerned with the type of wall construction wherein a gypsum sheathing is used as the substrate that is attached to the building structure.

It has long been conventional in the construction of exterior walls to utilize as a substrate a gypsum sheathing having treated paper adhered to opposite surfaces thereof. The normal procedure is to then adhere an insulation layer to one of the paper faces of the gypsum substrate, and then an outer finish layer or coat is applied or adhered to the insulating layer to complete the assembly. Although this type of wall construction has generally proven to be satisfactory, extrusive water penetration may cause deterioration of the treated paper on the gypsum substrate, causing same to separate from the gypsum sheathing, hence adversely affecting wall integrity.

In an effort to improve wall integrity, a gypsum sheathing has recently been introduced to the market wherein a non woven fiberglass matte is adhered to the surfaces of the gypsum core in lieu of the conventional treated paper. This product has been marketed under the name "Dens-Glass" (trademark of Georgia Pacific Corporation), and it has been found that the fiberglass matte is more resistant to breakdown or separation as a result of moisture penetration than is the treated paper. However, it has been found that sufficient moisture penetration may still result in deterioration of the bond of the fiberglass to the gypsum core and/or separation of same from the gypsum core. In addition, since fiberglass is not per se alkali resistant, it has been found that where the insulating layer is adhered to the gypsum/fiberglass substrate by use of a cementitious adhesive, as is frequently the case, the fiberglass is subject to alkali attack as a result of the adhesive, resulting in deterioration and/or separation of the fiberglass from the gypsum. Thus, although the fiberglass-faced gypsum has proven to be an improvement over the paper-faced gypsum, the former is still subject to deterioration resulting from excessive moisture penetration and/or alkali attack where certain cementitious adhesives are used in the assembly.

With the present invention, it has been found that if the fiberglass-faced gypsum is coated with a water-based, water-resistant coating, such as a water-based acrylic coating, for example, prior to the application of any adhesive thereto, and the coating is allowed to dry, it establishes a barrier against excessive moisture penetration, and at the same time it protects the fiberglass matte from alkali attack. In addition, since the fiberglass matte is porous, the aforesaid coating will penetrate therethrough to enhance the bond between the fiberglass matte and the gypsum core. By the same token, the aforesaid coating results in a better bond with the adhesive that is applied thereto in order to secure the insulating layer to the substrate, and greatly improves the water resistance of the bond between the fiberglass matte and the gypsum core.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention.

DESCRIPTION OF THE PREFERRED EMBODIMENT

Figure 1:
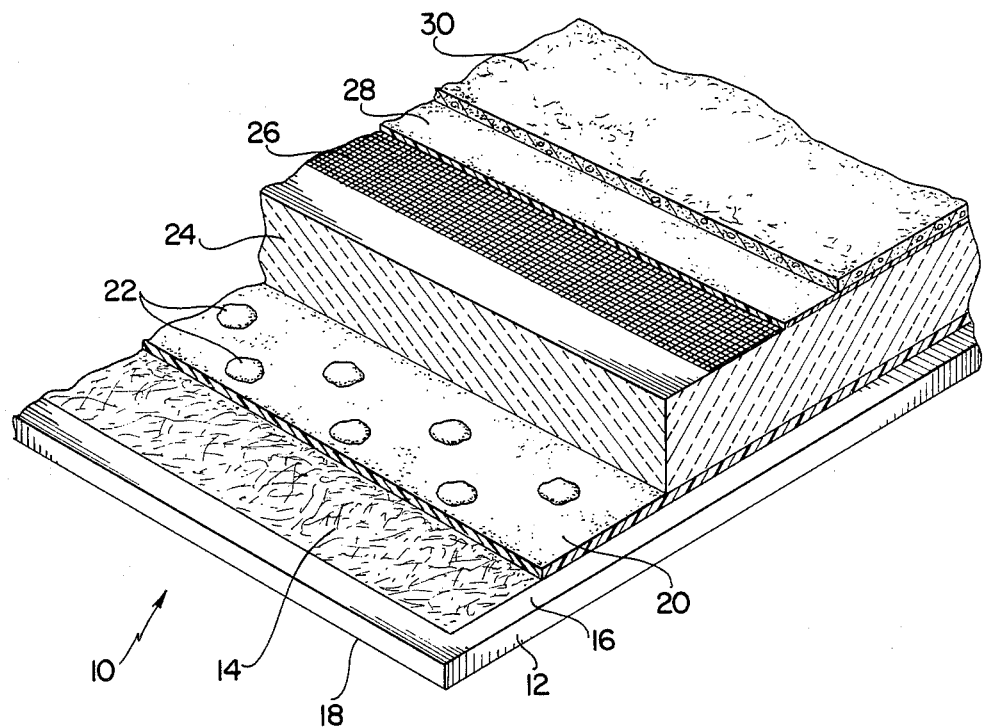
FIG. 1 is a schematic, fragmentary, perspective view, partially in cross section, of the laminated wall construction of the present invention showing the various layers and their relationship to one another.

There is shown generally at 10 a wall construction made in accordance with the present invention comprising a gypsum core or substrate 12 having a non woven fiberglass matte 14 laminated to the surfaces 16 & 18 thereof, it being understood that the inner surface 18 of the gypsum core is adhered to the building structure or framework (not shown) by any conventional means. The gypsum core 12 with the non woven fiberglass matte 14 laminated to the surfaces 16 and 18 thereof is sold on the market by Georgia Pacific Corporation under the name and trademark "Dens-Glass".

The surface 16 of the core 12 is coated with a water-based, water-resistant coating 20, it being understood that the coating 20 completely covers fiberglass matte 14, which in turn completely covers the surface 16 of gypsum core 12. Since the fiberglass matte 14 is inherently porous, the coating 20 penetrates therethrough so as to integrate and consolidate the fiberglass matte and at the same time improve the bonding of same to the gypsum core. The coating 20 is preferably acrylic, although other similar water-based, water-resistant coatings, such as vinyl acrylic, ethylene vinyl acetate, styrene acrylic, styrene butadiene rubber, and vinyl chloride acrylic may be used. After the coating 20 has been allowed to dry, a cementitious adhesive, such as "Primus/Adhesive" (trademark of Dryvit System, Inc.), is applied to the coated substrate as at 22, either by the ribbon and dab method or the notched trowel method, to receive and secure the insulating layer 24 which may be of any suitable foam material, such as, for example, expanded polystyrene. A woven fiberglass reinforcing mesh 26 is then positioned along the outer surface of the insulating layer 24, a base coat 28, such as the aforesaid "Primus/Adhesive", is applied thereto so as to completely cover same, and then a finishing material as shown at 30 is either troweled or sprayed thereover, or, if a self-supporting layer, it is adhered to the reinforced base coat surface of the insulation layer by any suitable means.

The key ingredient, and the feature which is really unique in the aforesaid assembly, is the water-based coating 20, the presence of which achieves a number of significant advantages. First of all, since the coating 20 is water resistant, it functions as a barrier to prevent moisture from penetrating to the fiberglass matte 14, which moisture, if unimpeded, would cause deterioration of the fiberglass and separation of same from the gypsum core 12, thereby destroying the integrity of the wall system. In addition since fiberglass is not alkali resistant, and since cementitious adhesives are alkaline, the fiberglass matte 14 would be subject to degradation and detertioration as a result of alkali attack. However, the coating 20 functions as a barrier that prevents alkali contact with the fiberglass. In addition, since the fiberglass matte 14 is porous, the coating 20 penetrates therethrough to further enhance the bond between the fiberglass matte 14 and the gypsum core 12, and at the same time greatly improve the water resistance of said bond. Lastly, the coating 20 consolidates and integrates the fiberglass matte 14 and permits a better bond between it and the adhesive 22 which secures the insulation layer 24 to the gypsum substrate.

A specific example of the coating 20 is as follows:

| Chemical | Generic | Function | Wt/# |
| --- | --- | --- | --- |
| Water | — | Dilutent | 300.0 |
| Natrosol Plus | Cellulosic | Thickener | 3.0 |
| KTPP | Phosphate | Dispersant | 1.0 |
| Tamol 960 | Salt of acid | Dispersant | 7.0 |
| Foamkill 639Q | Hydrocarbon | Defoamer | 2.0 |
| AMP-95 | Hydrocarbon | pH Adjuster | 0.5 |
| TiPure R-960 | Titanium dioxide | Primary Opacifier | 100.0 |
| Marblewhite 325 | Calcium carbonate | Extender Pigment | 175.0 |
| Syloid 221 | Silica | Flatting Agent | 5.0 |
| Propylene Glycol | Glycol | Open Time Additive | 15.0 |
| Bentone LT | Clay | Suspending Agent | 3.0 |
| AC-64 | Acrylic | Binder | 370.4 |
| Triton CA | Hydrocarbon | Color Acceptance | 3.0 |
| #200 Flour | Silica | Extender Pigment | 200.0 |
| Mineral Spirits | Hydrocarbon | Coalescent | 15.0 |
| Polyphase AF-1 | Hydrocarbon | Mildewcide | 1.5 |
| Texanol | Hydrocarbon | Coalescent | 6.0 |
| Foamaster VL | Oil | Defoamer | 2.0 |

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A laminated wall construction for building exteriors comprising a gypsum substrate, one surface of which is adapted to be secured to a building structure, a non woven fiberglass matte substantially completely covering the opposite surfaces of said substrate, and an insulating layer secured to the fiberglass surface opposite to said one surface by a cementitious adhesive, the improvement comprising a water-based, water-resistant coating completely covering said opposite surface to effectively enhance the bond between said fiberglass matte with said substrate, to protect the fiberglass from alkali attack that would normally result from the cementitious adhesive, to enhance the bond between said insulating layer and said opposite surface, and to increase the water resistance of said bonds.

2. The wall construction of claim 1 further characterized in that said coating is a water-based acrylic.

3. The wall construction of claim 1 further characterized in that said coating is selected from the group consisting of acrylic, vinyl acrylic, ethylene vinyl acetate, styrene acrylic, styrene butadiene rubber, and vinyl chloride acrylic.

* * * * *